US012168595B2

(12) United States Patent
Koyahata et al.

(10) Patent No.: US 12,168,595 B2
(45) Date of Patent: Dec. 17, 2024

(54) WEIGHT

(71) Applicant: KOBELCO CONSTRUCTION MACHINERY CO., LTD., Hiroshima (JP)

(72) Inventors: Akira Koyahata, Hyogo (JP); Dairo Matsui, Hyogo (JP); Takanobu Yamagami, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 149 days.

(21) Appl. No.: 17/996,434

(22) PCT Filed: Apr. 22, 2021

(86) PCT No.: PCT/JP2021/016378
§ 371 (c)(1),
(2) Date: Oct. 18, 2022

(87) PCT Pub. No.: WO2021/220944
PCT Pub. Date: Nov. 4, 2021

(65) Prior Publication Data

US 2023/0219793 A1 Jul. 13, 2023

(30) Foreign Application Priority Data

Apr. 27, 2020 (JP) ................................ 2020-078386
Feb. 26, 2021 (JP) ................................ 2021-031158

(51) Int. Cl.
*B66C 23/90* (2006.01)

(52) U.S. Cl.
CPC .................................. *B66C 23/90* (2013.01)

(58) Field of Classification Search
CPC .......... B66C 1/40; B66C 13/44; B66C 13/50; B66C 15/065; B66C 23/90
See application file for complete search history.

(56) References Cited

U.S. PATENT DOCUMENTS 6,916,014 B1 7/2005 Thomas
2007/0078460 A1 4/2007 Frigg et al.
(Continued)

FOREIGN PATENT DOCUMENTS

CN 102720800 A 10/2012
JP 48-86550 U 10/1973
(Continued)

OTHER PUBLICATIONS

International Search Report issued Jul. 6, 2021 in PCT/JP2021/016378 filed on Apr. 22, 2021, 2 pages.
(Continued)

*Primary Examiner* — Emmanuel M Marcelo
(74) *Attorney, Agent, or Firm* — Oblon, McClelland, Maier & Neustadt, L.L.P.

(57) ABSTRACT

Provided is a weight capable of being easily attached to and detached from a load suspended-load rope. The weight is disposed to detect overwinding of a load suspended-load rope suspended from a derricking member of a construction machine. The weight includes a weight body, which has a cylindrical shape enclosing the load suspended-load rope, configured to be suspended from the derricking member through a string-like part. The weight body is formed with a rope insertion space that allows the load suspended-load rope to pass through the rope insertion space in the radius direction of the suspended-load rope. The rope insertion space includes an oblique slit part, which has a shape oblique to the center axis.

19 Claims, 16 Drawing Sheets

(56) References Cited

U.S. PATENT DOCUMENTS

| | | | |
|---|---|---|---|
| 2011/0152940 A1 | 6/2011 | Frigg et al. |
| 2017/0217738 A1 | 8/2017 | Saker et al. |

FOREIGN PATENT DOCUMENTS

| | | | |
|---|---|---|---|
| JP | 50-125962 | | 10/1975 |
| JP | 2009-505748 A | | 2/2009 |
| JP | 2013-18616 A | | 1/2013 |
| JP | 2019172385 A | * | 10/2019 |

OTHER PUBLICATIONS

Extended European Search Report issued on Aug. 10, 2023 in European Patent Application No. 21795478.3, 7 pages.

European Office Action issued May 6, 2024 in European Patent Application No. 21 795 478.3, 6 pages.

* cited by examiner

WEIGHT

TECHNICAL FIELD

The present invention relates to a weight.

BACKGROUND ART

A weight is used to detect over-winding of a suspended-load rope suspended from a derricking member of a construction machine, for example, a jib of a crane. The weight described in Patent Document 1 is suspended from a jib by a wire rope, which is connected to a limit switch disposed in the jib. The weight is cylindrical to enclose an insertion hole that allows a suspended-load rope to pass therethrough. The weight is disposed so as to allow over-winding of the suspended-load rope to be detected by the limit switch. Specifically, when wound up, the suspended-load rope brings a hook that is suspended through the suspended-load rope into contact with the weight from below and causes the hook to be wound up together with the weight. The lift of the weight reduces the tension of the wire rope, that is, the force applied to the limit switch, to change the signal output from the limit switch, thereby enabling the over-winding of the suspended-load rope to be detected.

The weight described in Patent Document 1 requires the suspended-load rope to be inserted though the insertion hole from one end side thereof, the insertion hole enclosed by the weight which is being suspended through the wire rope, and further requires the hook to be attached to the suspended-load rope which is passing through the insertion hole. In summary, the weight requires the insertion of the suspended-load rope into the weight before the hook is attached to the suspended-load rope and the attachment and detachment of the suspended-load rope and the hook every time the weight is attached and detached. This hinders the weight from being attached to and detached from the suspended-load rope easily.

In order to facilitate such attachment/detachment work, a weight described in Patent Document 2 is proposed. The weight includes a weight body and an attachment/detachment member. The weight body has a circumferentially partially cylindrical shape. Specifically, the weight body is formed with a rope passage allowing space cutting through the weight body axially. The attachment/detachment member is detachably attached to the weight body so as to close the rope passage allowing space. The weight body allows the suspended-load rope to be inserted into the inside of the weight body radially of the weight body through the rope passage allowing space. The attachment/detachment member is thereafter attached to the weight body so as to close the rope passage allowing space, thereby preventing the suspended-load rope from removal from the inside of the weight body through the rope passage allowing space. As described above, the weight described in Patent Document 2 eliminates the need to attach and detach the hook to/from the suspended-load rope for attaching and detaching the weight to/from the suspended-load rope.

The weight described in Patent Document 2, however, requires work for the attachment/detachment of the attachment/detachment member to/from the weight body.

CITATION LIST

Patent Literature

Patent Literature 1: Japanese Unexamined Patent Publication No. 2013-18616

Patent Document 2: Japanese Unexamined Patent Publication No. 2019-172385

SUMMARY OF INVENTION

It is an object of the present invention to provide a weight capable of being easily attached to and detached from a suspended-load rope.

Provided is a weight disposed around a suspended-load rope suspended from a derricking member of a construction machine to detect over-winding of the suspended-load rope. The weight includes a weight body. The weight body is suspended through at least one string-like part suspended from the derricking member, having a cylindrical shape capable of enclosing the suspended-load rope. The weight body is formed with a rope insertion space partially with respect to a circumference direction, the rope insertion space passing through the weight body in a radius direction of the weight body to allow the suspended-load rope to be inserted through the rope insertion space in the radius direction. The rope insertion space has a shape cutting through the weight body from one end of the weight body to the other end on the opposite side to the one end in an axis direction that is parallel to a center axis of the weight body. The rope insertion space includes at least one oblique slit part oblique to the center axis so as to prevent the suspended-load rope from passing through the oblique slit part in a state where the center axis and the suspended-load rope are parallel to each other.

DESCRIPTION OF EMBODIMENTS

Figure 1:
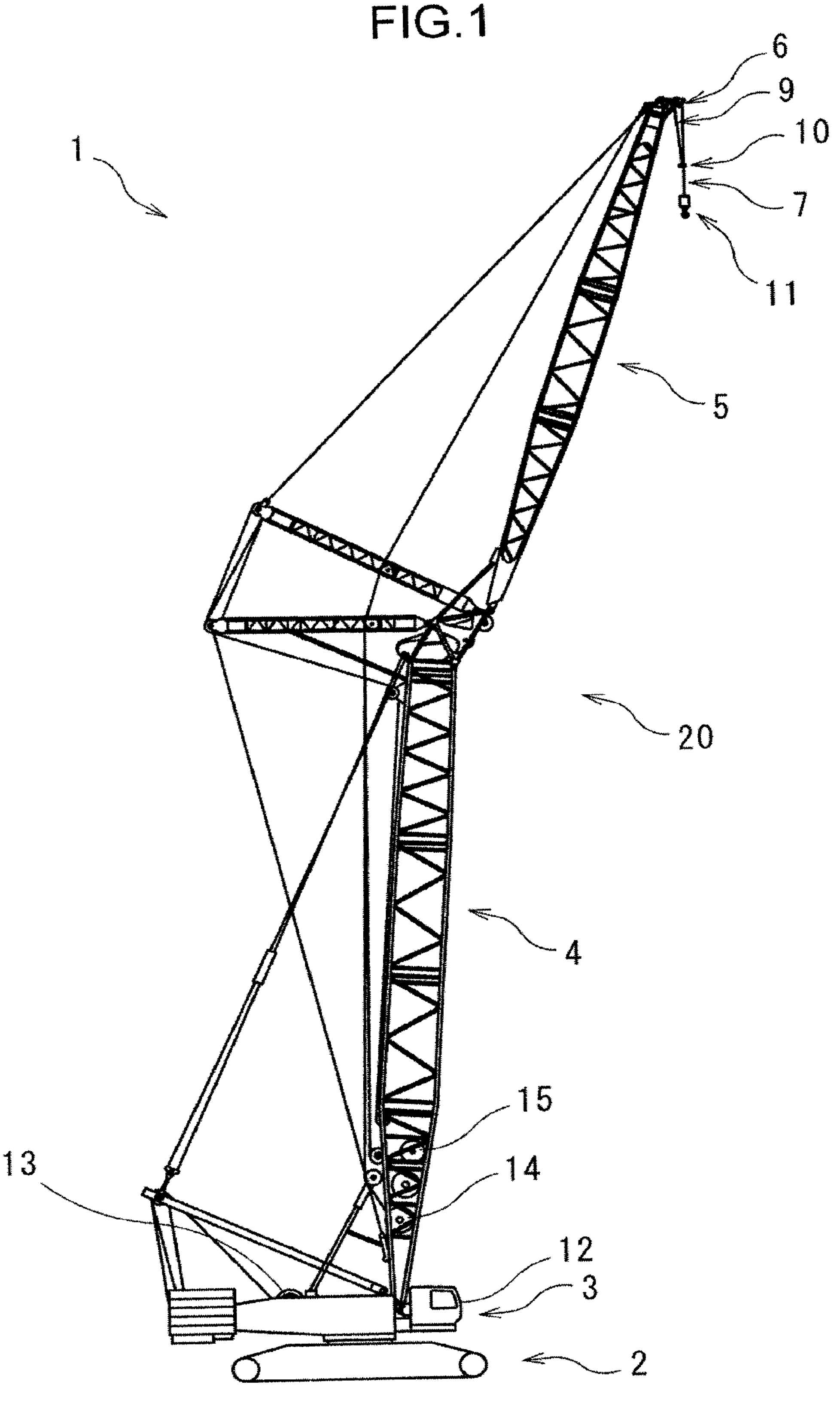
FIG. 1 is a side view showing a construction machine to which a weight according to each embodiment of the present invention is attached.

Below will be described weights according to respective embodiments of the present invention. The outline thereof is as follows.

The weight is disposed around a suspended-load rope suspended from a derricking member of a construction machine in order to detect over-winding of the suspended-load rope. The weight includes a weight body. The weight body is suspended through at least one string-like part suspended from the derricking member, having a cylindrical shape capable of enclosing the suspended-load rope. The weight body is formed with a rope insertion space partially with respect to a circumference direction, the rope insertion space passing through the weight body in a radius direction of the weight body to allow the suspended-load rope to be inserted through the rope insertion space in the radius direction. The rope insertion space has a shape that cuts through the weight body from one end of the weight body to the other end on the opposite side in an axis direction parallel to a center axis of the weight body. The rope insertion space includes at least one oblique slit part oblique to the center axis so as to prevent the suspended-load rope from passing through the oblique slit part in a state where the center axis and the suspended-load rope are parallel to each other.

The rope insertion space of the weight body allows the suspended-load rope to be inserted into the inside and removed to the outside of the weight body through the rope insertion space in the radius direction, thereby facilitating the disposition of the weight body around the suspended-load rope. Furthermore, the rope insertion space, which includes at least one oblique slit part oblique to the center axis so as to prevent the suspended-load rope from passing through the oblique slit part in a state where the center axis and the suspended-load rope are parallel to each other, can restrain the suspended-load rope from removal from the weight body in the radius direction, the weight body being suspended through the at least one string-like part. Thus are achieved both of facilitating attachment and detachment of the weight body to and from the suspended-load rope and restraining the suspended-load rope from unintended removal from the weight body.

Preferably, the at least one oblique slit part includes an oblique slit part having an average of obliquity angle of 30° or more and 60° or less to the center axis. The "average of the obliquity angle" is an average value of respective obliquity angles to the center axis at arbitrary three points in the oblique slit part. Too small average of the obliquity angles, which may allow the weight to be easily attached to and detached from the suspended-load rope, makes the suspended-load rope likely to be removed from the weight. On the other hand, too large average of the obliquity angles, which may restrain the suspended-load rope from being removed from the weight, hinders the weight from being attached to and detached from the suspended-load rope easily.

It is preferable that the at least one oblique slit part includes an oblique slit part having a constant obliquity angle to the center axis. The oblique slit part thus having a constant obliquity angle to the center axis allows the weight to be more easily attached to and detached from the suspended-load rope. Here, "the obliquity angle is constant" intends to encompass not only modes where the obliquity angle is strictly constant but also modes where the variation in the obliquity angle is so small that the obliquity angle can be regarded as substantially constant. Specifically, it is preferable that the difference between the maximum value and the minimum value of the obliquity angle is equal to or less than 10°. The difference, more preferably, is equal to or less than 5°, more preferably equal to or less than 1°.

It is preferable that the at least one oblique slit part includes an oblique slit part having a width decreased inward in the radius direction from the outside of the weight body. The reduction in the width of the oblique slit part may be either continuous or stepwise. The oblique slit part thus having a width decreased inward in the radius direction from the outside of the weight body enables the suspended-load rope to be easily inserted into the oblique slit part from the outside of the weight body while restraining the suspended-load rope from unintended removal from the weight body.

Preferably, the at least one oblique slit part includes a spiral slit part extending along a spiral around the center axis as a center, the number of turns of the spiral being smaller than 1. The "number of turns of the spiral" is the ratio of the circumferential length of the actual spiral to the circumferential length of the reference spiral, which is a spiral having the same spiral angle as the actual spiral and completing just one revolution around the weight body. The spiral slit part thus having the number of turns of less than 1 allows the weight to be easily attached to and detached from the suspended-load rope, while effectively restraining the suspended-load rope from being removed from the weight body in the radius direction toward the outside through the oblique slit part.

It is preferable that the rope insertion space is composed of only the at least one oblique slit part. This maximizes the circumferential length of the oblique slit part of the weight body to thereby enable the suspended-load rope to be more effectively restrained from unintended removal from the weight body.

The at least one oblique slit part may include a first oblique slit part and a second oblique slit part located at respective positions different from each other in the axis direction.

In this case, it is preferable that the first oblique slit part and the second oblique slit part have respective obliquity angles different from each other to the center axis. This enhances the effect of restraining the suspended-load rope from being removed from the weight body to the outside in the radius direction. The effect is further enhanced when the first oblique slit part and the second oblique slit part are oblique to the center axis in reverse directions to each other.

Preferably, the at least one oblique slit part includes a first oblique slit part and a second oblique slit part that are separated from each other in the axis direction, and the rope insertion space further includes an intermediate opening part interposed between the first oblique slit part and the second oblique slit part, the intermediate opening part having a width larger than a width of the first oblique slit part and a width of the second oblique slit part. According to the combination of the first and second oblique slit parts and the intermediate opening part, the first and second oblique slit parts restrain the suspended-load rope from unintended removal from the weight body toward the outside in the radius direction, while the intermediate opening part allows the weight to be easily disposed around the suspended-load rope regardless of the presence of the first and second oblique slit parts.

It is preferable that the second oblique slit part has a center line deviated from the extension of the center line of the first oblique slit part. The center line of each of the first and second oblique slit parts is a line connecting widthwise intermediate points of each of the first and second oblique slit parts. The above-described mutual deviation of the center lines of the first and second oblique slit parts disposed on both sides of the intermediate opening part enhances the effect of restraining of the suspended-load rope from unintended removal from the weight body to the outside in the radius direction.

Specifically, it is preferable that the first oblique slit part and the second oblique slit part are oblique to the center axis in reverse directions to each other. This enables the suspended-load rope to be more reliably restrained from unintended removal from the weight body toward the outside in the radius direction.

Preferably, the first oblique slit part has a first opening-side end which is an end continued to the intermediate opening part, and the second oblique slit part has a second opening-side end which is an end continued to the intermediate opening part, the second opening-side end being located at a position deviated from the position of the first opening-side end of the weight body in the circumference direction. Such mutual deviation of the first and second opening side ends of the first and second oblique slit parts, which are ends continued to the intermediate opening parts, respectively, in the circumference direction of the weight body, enables the suspended-load rope to be more reliably restrained from unintended removal from the weight body toward the outside in the radius direction.

Specifically, it is preferable that: the intermediate opening part has a first end edge and a second end edge that are opposed to each other in the center axis direction, each of the first end edge and the second end edge extending in a circumference direction of the weight body; the first opening-side end is continued to one half of the first end edge in the circumference direction; and the second opening-side end is continued to the other half of the second end edge in the circumference direction. Such continuity of the first and second opening-side ends to respective halves different from each other in the circumference direction of the intermediate opening part can enhance the effect of restraining the suspended-load rope from the removal.

More specifically, the intermediate opening part preferably has a shape of rectangle when viewed of the weight body in the radius direction, the rectangle having upper side and lower side that are formed by the first end edge and the second end edge, respectively.

Preferably, the weight further includes a pair of attachment parts. The pair of attachment parts are provided at a pair of attachment positions which are deviated from the rope insertion space on an outer peripheral surface of the weight body, the attachment parts being configured to be connected a pair of string-like parts which are included in the at least one string-like part, respectively. The pair of attachment positions are positions opposed to each other in the radius direction across the center axis. The pair of attachment parts thus arranged are less likely to hinder the attachment/detachment work of the weight to/from the suspended-load rope, allowing the work to be easily performed.

Next will be described the detail of embodiments according to the invention with appropriate reference to the drawings.

Figure 2:
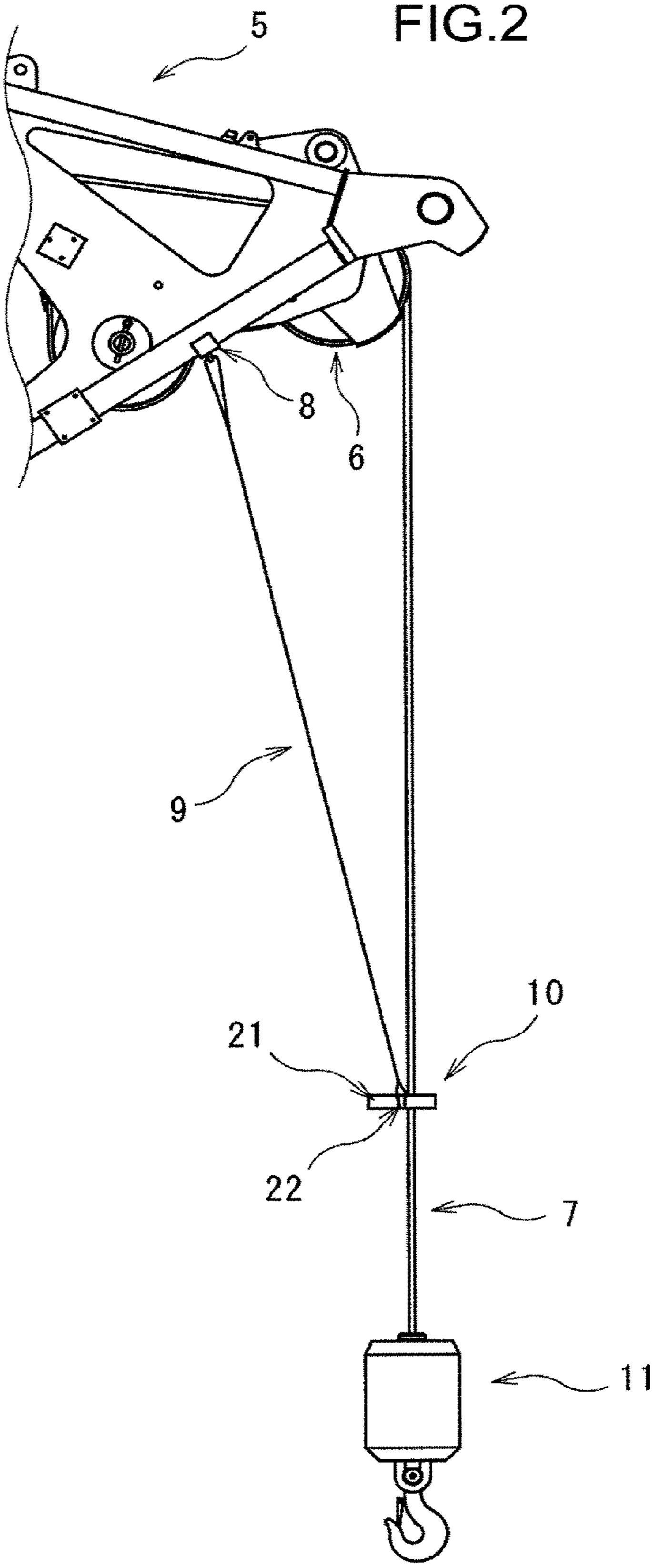
FIG. 2 is a side view showing a derricking member of the construction machine and a hook and a weight suspended from the derricking member.

FIG. 1 and FIG. 2 show a construction machine 1 according to each of the embodiments. The construction machine 1 includes a lower traveling body 2, an upper turning body 3, and a derricking member 20. The upper turning body 3 is mounted on the lower traveling body 2 capably of horizontally turning. The derricking member 20 is attached to the upper turning body 3 capably of rotational movement in a derricking direction. The construction machine 1 shown in FIG. 1 is a crane. The derricking member 20 includes a boom 4, a jib 5, and a sheave 6. The boom 4 has a proximal end and a distal end on the opposite side thereof, and the boom 4 is attached to the upper turning body 3 such that the proximal end is rotatable in the derricking direction. The jib 5 has a proximal end and a distal end on the opposite side thereof, the proximal end being connected to the distal end of the boom 4 capably of rotational movement in the derricking direction. The sheave 6 is rotatably attached to the distal end of the jib 5

Figure 3:
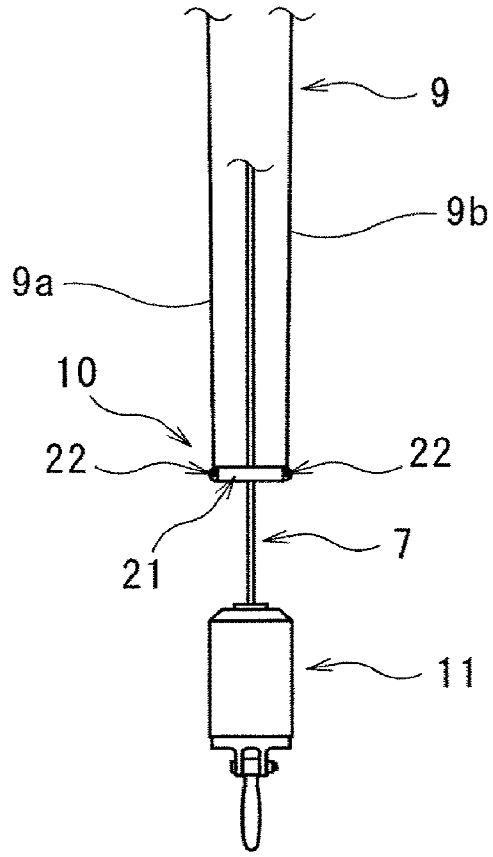
FIG. 3 is a front view showing a state where the weight shown in FIG. 1 is attached.
Figure 4:
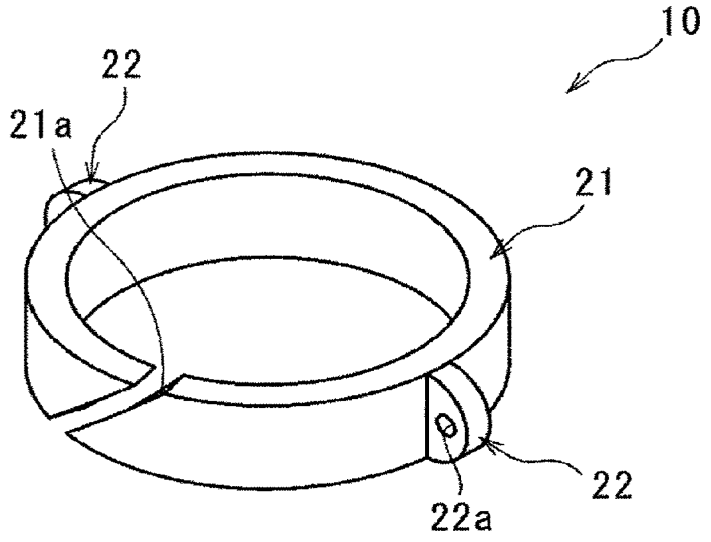
FIG. 4 is a perspective view of a weight according to the first embodiment of the present invention.
Figure 5:
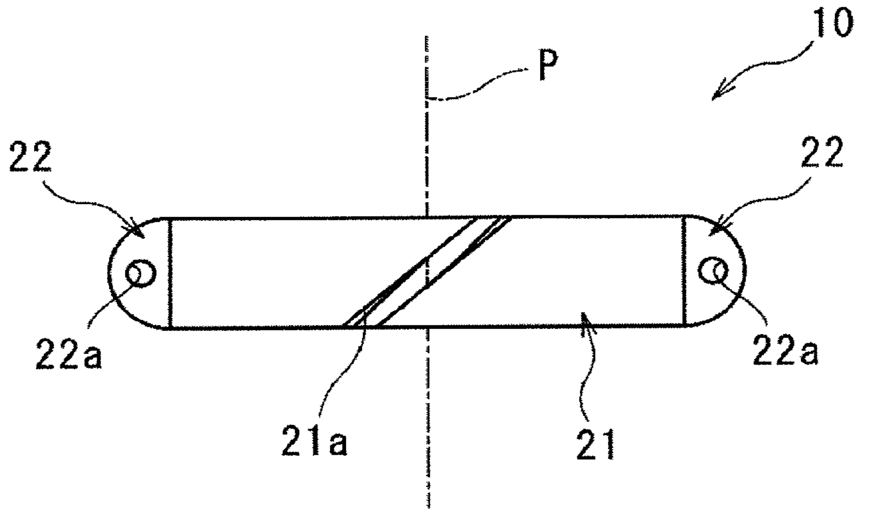
FIG. 5 is a front view of the weight shown in FIG. 4.
Figure 6:
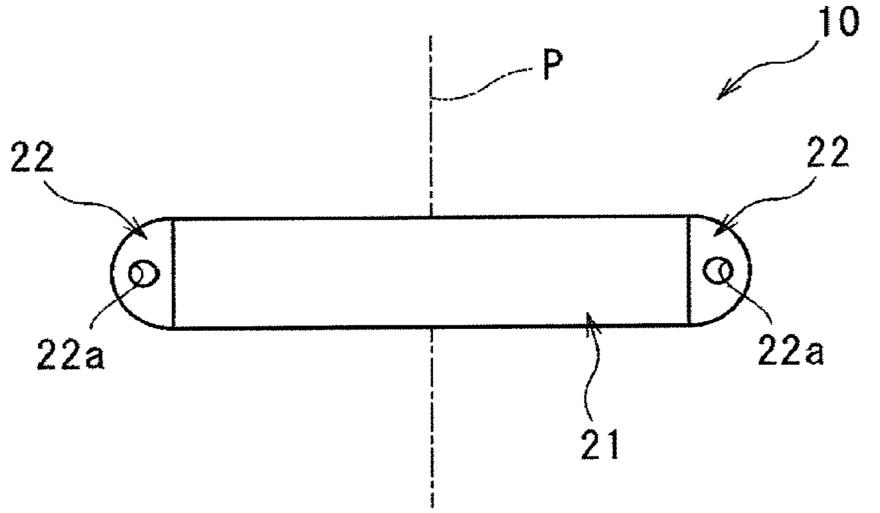
FIG. 6 is a rear view of the weight shown in FIG. 4.
Figure 7:
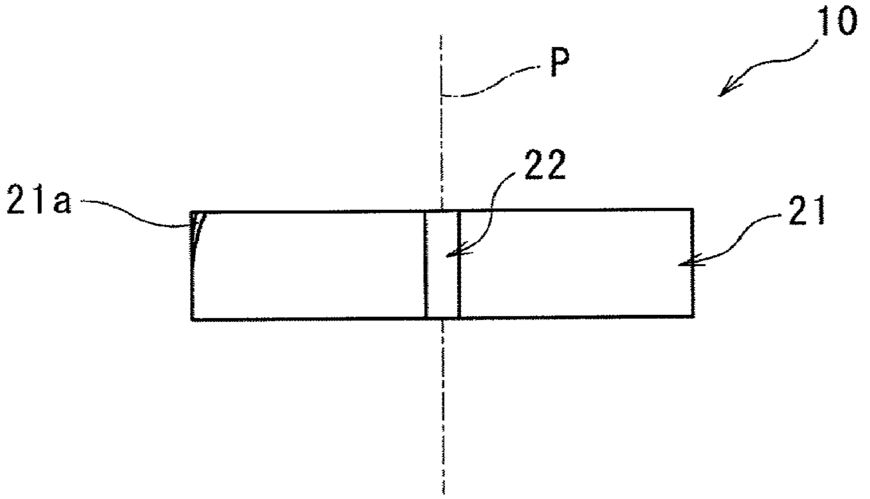
FIG. 7 is a right side view of the weight shown in FIG. 4.
Figure 8:
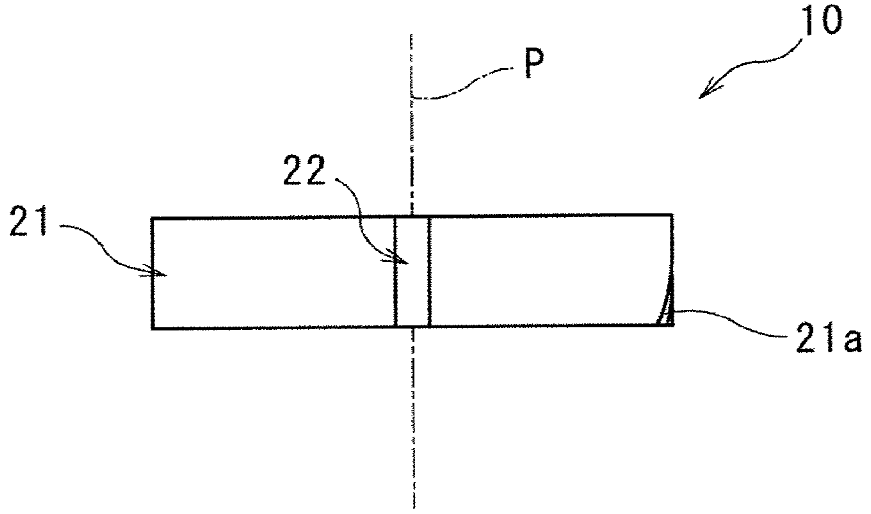
FIG. 8 is a left side view of the weight shown in FIG. 4.
Figure 9:
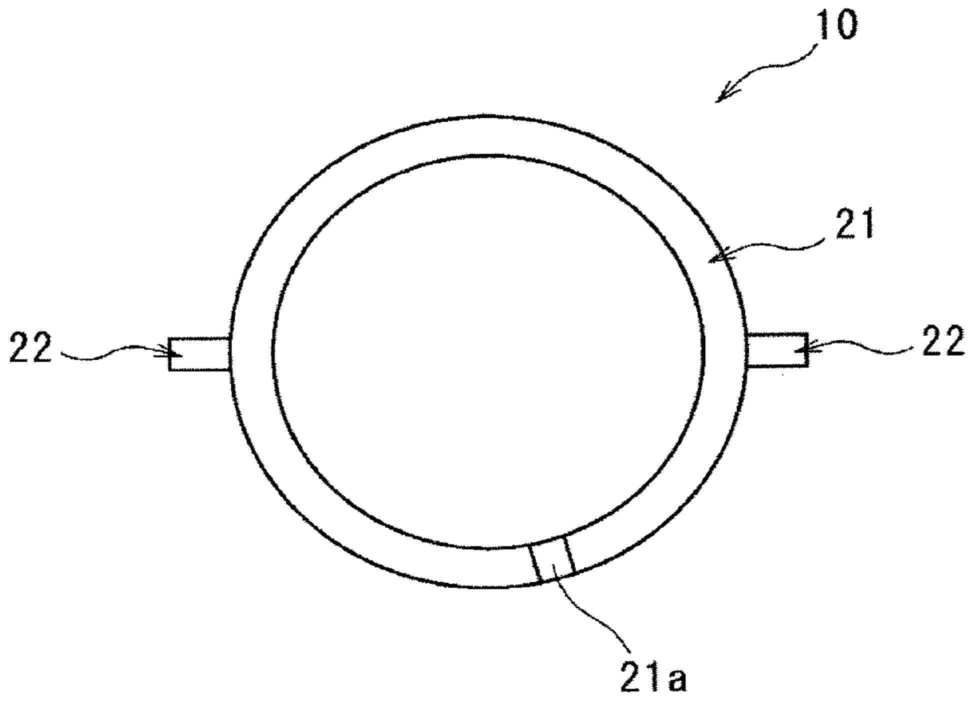
FIG. 9 is a plan view of the weight shown in FIG. 4.
Figure 10:
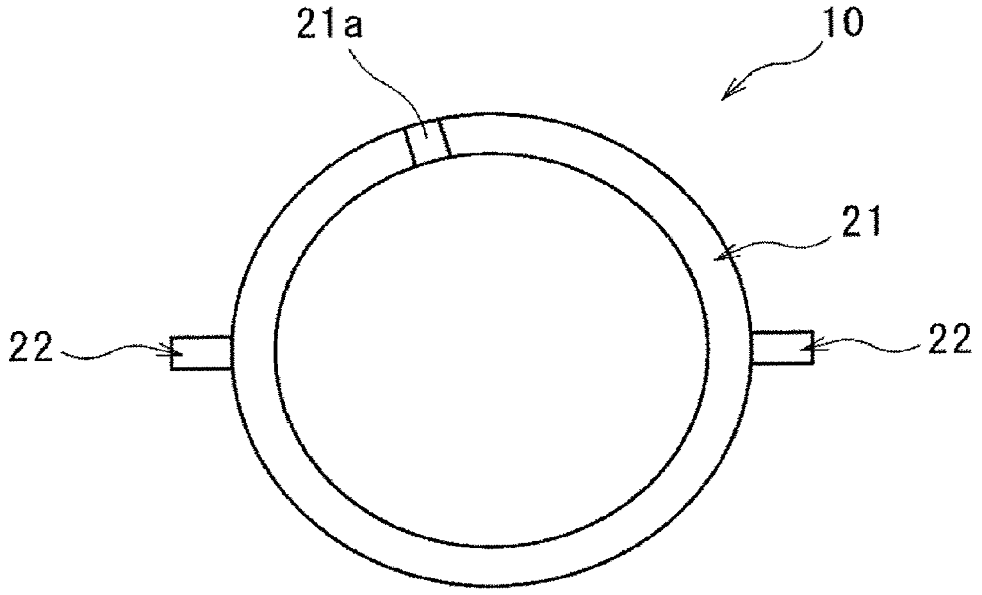
FIG. 10 is a bottom view of the weight shown in FIG. 4.

The construction machine 1 further includes a suspended-load rope 7, a limit switch 8, a pair of string-like parts 9*a* and 9*b*, a weight 10, and a hook 11. The suspended-load rope 7 is suspended from the sheave 6 of the derricking member 20. In the example shown in FIG. 2, the limit switch 8 is fixed to a part slightly rearward of the sheave 6 in the example shown in FIG. 2. The pair of string-like parts 9*a* and 9*b* are suspended from the derricking member 20. The string-like parts 9*a*, which is one of the pair of string-like parts 9*a* and 9*b*, is connected to the limit switch 8. As shown in FIG. 3, the pair of string-like parts 9*a* and 9*b* are suspended from left and right sides of the derricking member 20, respectively. The weight 10 is connected to respective lower ends of the string-like parts 9*a* and 9*b* so as to be capable of detecting the over-winding of the suspended-load rope 7 suspended from the derricking member 20. The hook 11 is connected to the lower end of the suspended-load rope 7 so as to be suspended through the suspended-load rope 7. In the present specification, the "left side" and the "right side" correspond to the "left side" and the "right side" of the derricking member (for example, the jib or the boom), respectively, when the distal end side of the derricking member from which the suspended-load rope is suspended is a front side and the proximal end side is a rear side.

As shown in FIGS. 2 and 3, the weight 10 includes a weight body 21 and a pair of attachment parts 22. The weight body 21 has a cylindrical shape enclosing the suspended-load rope 7 and has a cylindrical outer peripheral surface. The pair of attachment parts 22 are disposed at a pair of attachment positions on the outer peripheral surface of the body 21 to be connected to the pair of string-like parts 9*a* and 9*b*, respectively.

The weight body 21, preferably, has a cylindrical shape as shown in FIGS. 4 to 10. Specifically, it is preferable that the weight body 21 has a cylindrical inner peripheral surface and a cylindrical outer peripheral surface with an inner diameter and an outer diameter each being uniform over the center axis direction thereof. The weight body 21 is formed with a rope insertion space in a part of the weight body 21 with respect to the circumference direction. The rope insertion space according to this embodiment is a single slit 21*a*. The slit 21*a* passes through the weight body 21 in the radius direction of the weight body 21, thereby allowing the suspended-load rope 7 to be inserted through the slit 21*a* in the radius direction. The slit 21*a* has a shape cutting through the weight body 21 from one end of the weight body 21 to the other end on the opposite side to the one end in the axis direction that is parallel to the center axis P of the weight body 21.

The slit 21*a* is oblique to the center axis P at a constant obliquity angle so as to prevent the suspended-load rope 7 from passing through the slit 21*a* in a state where the center axis P and the suspended-load rope 7 are parallel to each other. The rope insertion space according to the present embodiment is, thus, composed of only the slit 21*a*, which is a single oblique slit part. This enables the slit 21*a* to have a maximized length in the circumference direction of the weight body 21, thereby enabling the suspended-load rope 7 to be effectively restrained from unintended removal from the weight body 21 toward the outside in the radius direction. The slit 21*a*, preferably, has a width, which is the interval between opposite end edges of the slit 21*a* viewed in the axis direction, larger than the diameter of the suspended-load rope 7.

The pair of attachment positions are set such that the pair of attachment parts 22 are horizontally aligned, preferably, opposed to each other in the radius direction across the center axis P, in a state where the weight 10 is suspended from the derricking member 20 through the pair of string-like parts 9. The weight 10 is preferably used in a posture where the center axis P of the weight body 21 extends vertically, that is, an posture where the axis direction which is the direction of the center axis P coincides with the direction of the center axis of the suspended-load rope 7 that is being inserted through the weight body 21 of the weight 10. This enables the oblique of the slit 21*a* to the center axis P to restrain the suspended-load rope 7 from removal to the outside of the weight body 21 through the slit 21*a* in the use state, in spite of no member to close the slit 21*a*.

As described above, the rope insertion space constituted by the slit 21*a* has a shape that allows the suspended-load rope 7 to be inserted into and removed from the inside of the weight body 21 through the rope insertion space in the radius direction. Specifically, the slit 21*a* has a minimum width greater than or equal to the diameter of the suspended-load rope 7. The width of the slit 21*a* is preferably uniform over the entire region in the axis direction.

The width of the slit 21*a*, with respect to the radius direction of the weight body 21, that is, the thickness direction of the weight body 21, may be either uniform or decreased inward from the outside in the radius direction of the weight body 21. The slit 21*a*, if having a width that decreases inward from the outside in the radius direction of the weight body 21 as described above, enables the suspended-load rope 7 to be easily inserted from the outside to the inside of the weight body 21 through the slit 21*a* while effectively restraining the suspended-load rope 7 from unintended removal from the weight body 21.

The direction of the obliquity of the slit 21*a* to the center axis P according to this embodiment is constant from one end to the other end of the slit 21*a* in the axis direction. For example, the slit 21*a* has a shape along a spiral around the center axis P of the weight body 21 as a center. In other words, the slit 21*a*, for example, constitutes a spiral slit part that extends spirally or partially spirally. The slit 21*a* having such a shape effectively restrains the suspended-load rope 7 from unintended removal toward the outside in the radius direction of the weight body 21 through the slit 21*a*. The slit 21*a* can have also a shape that cuts through the weight body 21 in a straight line in a front view (radial view) of the weight body 21.

The average of obliquity angles in the oblique slit part, namely, the slit 21*a* in this embodiment, to the center axis P, is preferably 30° or more, and more preferably 40° or more. On the other hand, the average of the obliquity angles is preferably 60° or less, and more preferably 50° or less. Most preferably, the average of the angles of obliquity is 45°. Too small average of the obliquity angles, although allowing the weight body 21 to be easily attached to and detached from the suspended-load rope 7, allows the suspended-load rope 7 to be easily removed from the weight body 21 through the slit 21*a*. Too large average of the obliquity angles, reversely, although restraining the suspended-load rope 7 from the removal, hinders the weight body 21 from being easily attached to/detached from the suspended-load rope 7.

It is preferable that the obliquity angle of the oblique slit part to the center axis P is constant. Specifically, in the present embodiment, it is preferable that the obliquity angle of the slit 21*a* is constant from one end (upper end) of the slit 21*a* to the other end (lower end) of the slit 21*a* in the axis direction. This enables the weight body 21 to be more easily attached to and detached from the suspended-load rope 7.

As to the slit 21*a* that extends along a spiral around the center axis P as a center, that is, as to the slit 21*a* that is a spiral slit part, the number of turns of the spiral is preferably smaller than 1. The "number of turns of the spiral" is the ratio of the circumferential length of the actual spiral to the circumferential length of a reference spiral, which is a spiral having the same spiral angle as the actual spiral and completing just one revolution around the weight body. If having the number of turns that is less than 1, the slit 21*a* can allow the weight body 21 to be easily attached to and detached from the suspended-load rope 7 in spite of the spiral shape thereof. The number of turns, conversely, may be 1 or more. This enables the suspended-load rope to be more reliably restrained from unintended removal from the weight body.

Each of the attachment parts 22 protrudes outward in the radius direction of the weight body 21 from the outer peripheral surface of the weight body 21. The pair of attachment parts 22 have respective locking holes 22*a* that are connectable to the pair of string-like parts 9*a* and 9*b*, respectively. The specific shape of the attachment part 22, however, is not limited. For example, the attachment part 22 may include a protrusion part that protrudes outward in the radius direction of the weight body 21 from an outer peripheral surface of the weight body 21, and an engagement part formed of a shackle or the like connected to the protruding part and configured to be engaged with the pair of string-like parts 9*a* and 9*b*, respectively, to thereby allow the pair of attachment parts 22 and the pair of string-like parts 9*a* and 9*b* to be interconnected.

The pair of attachment parts 22, preferably, are disposed at a pair of attachment positions opposed to each other across the center of gravity of the weight body 21, respectively. In the present embodiment, the pair of attachment parts 22 are disposed at respective positions opposed to each other in the radius direction across the center axis P. The pair of attachment parts 22 are provided on the outer peripheral surface of the weight body 21 at respective positions separated from the slit 21*a* in the circumference direction of the weight body 21. In other words, the slit 21*a* is formed in a part protruding to one side of a virtual plane that passes through the center axis P and the pair of attachment parts 22 of the weight body 21.

The pair of thus disposed attachment parts 22 are prevented from interfering with the suspended-load rope 7 when the weight body 21 is attached to and detached from the suspended-load rope 7, thereby allowing the weight body 21 to be easily attached to and detached from the suspended-load rope 7.

As shown in FIG. 2, when suspended through the pair of string-like parts 9*a* and 9*b*, the weight body 21 has a part that protrudes to one side of that virtual plane passing through the center axis P and the pair of attachment parts 22 of the weight body 21, that is, forward in FIG. 2, the part being likely to come into contact with the suspended-load rope 7; therefore, providing the above-mentioned slit 21*a* in a part on the other side, that is, a part on a side where the weight body 21 does not come into contact with the suspended-load rope 7, enables the suspended-load rope 7 to be more effectively restrained from unintended removal from the weight body 21.

The slit 21*a* is, preferably, so oblique as to locate opposite ends of the slit 21*a* on both sides of the intermediate position of the pair of attachment parts 22 in the circumference direction of the weight body 21, that is, so as to extend across the intermediate position. The slit 21*a* thus being oblique can restrain the suspended-load rope 7 from unintendedly entering the slit 21*a* in the use state where the suspended-load rope 7 has been already inserted into the weight body 21.

In the construction machine 1, the lower traveling body 2 includes a traveling device such as a crawler or a wheel. The upper turning body 3 includes a cabin 12 for operator, a boom derricking winch 13 for derricking the boom 4, a jib derricking winch 14 for derricking the jib 5, a hoisting winch 15 for winding up the suspended-load rope 7, and the like. The boom 4 includes, for example, a lower boom attached to the upper turning body 3, one or more intermediate booms, and a tower cap, which are arranged in this order longitudinally from the proximal end side to the tip side. The boom 4 alternatively can include an upper boom instead of the tower cap.

The jib 5 includes, for example, a plurality of partial jib 5, which are connected to each other longitudinally of the jib 5 to thereby form the jib 5. Out of the plurality of partial jib, the partial jib that forms the proximal end of the jib 5 is connected to the tip part of the boom 4.

The suspended-load rope 7 is suspended from the sheave 6. Specifically, the suspended-load rope 7 is placed on the sheave 6 and suspended vertically downward from the sheave 6.

The hook 11 is attached to a lower end of the suspended-load rope 7 which is drawn from the winding winch 15 and suspended from the sheave 6.

The limit switch 8 is disposed at a position apart in the front-rear direction from the suspended-load rope 7 suspended as described above. The pair of string-like parts 9*a* and 9*b* connected to the limit switch 8, therefore, are suspended from a position apart in the front-rear direction from the suspension position of the suspended-load rope 7. In the construction machine 1, hence, a force acts on the weight 10 to return the weight 10 in a direction in which the weight 10 approaches the pair of string-like parts 9*a* and 9*b* in a state where the suspended-load rope 7 is inserted through the inside of the weight body 21. This makes a part of the weight body 21, the part located forward of the virtual plane passing through the center axis P and the pair of attachment parts 22, be likely to come into continuous contact with the suspended-load rope 7. Hence, providing the slit 21*a* in a part of the weight body 21 on the opposite side to the side on which the weight body 21 the suspended-load rope 7 contacts the suspended-load rope 7 makes it possible to more effectively restrain the suspended-load rope 7 from unintended removal from the weight body 21 through the slit 21*a*.

As shown in FIG. 3, the pair of string-like parts 9*a* and 9*b* are suspended from both left side and right side parts of the derricking member, namely, the jib 5 in the present embodiment, at respective positions apart from the suspended-load rope 7, which is being suspended, in the front-rear direction. The string-like part 9*a* which is one of the pair of string-like parts 9*a* and 9*b* has an upper end, which is connected to a limit switch 8. The other string-shaped part 9*b* has an upper end, which is connected to the jib 5 at a position where the upper end is opposed to the limit switch 8 in the left-right direction. Each of the string-like parts 9*a* and 9*b* is, for example, a wire rope, a chain, or a link. The lower ends of the pair of string-like parts 9*a* and 9*b* may have respective annular engagement parts connectable to the pair of attachment parts 22, respectively.

The "at least one string-shaped part" disclosed in the present application may include either a single string-like part or three or more string-like parts. In correspondence to this, the "at least one attachment part" may include either only a single attachment part or three or more attachment parts.

The weight 10 described above includes the weight body 21 formed with a rope insertion space, which has a shape cutting through the weight body 21 from one end to the other end of the weight body 21 in the axis direction parallel to the center axis P to thereby enable the suspended-load rope 7 to be inserted into the inside of the weight body 21 at any time point in assembly work for the construction machine 1. Moreover, the rope insertion space, which includes the slit 21*a* as an oblique slit part oblique to the center axis P, enables the suspended-load rope 7 to be restrained from removal to the outside in the radius direction of the weight body 21 through the rope insertion space in a state where the weight body 21 is suspended through the string-like parts 9*a* and 9*b* and the suspended-load rope 7 is inserted through the weight body 21 while being parallel to the center axis P. The weight 10, thus, can restrain the suspended-load rope 7 from unintended removal from the weight body 21 while being easily attachable to and detachable from the suspended-load rope 7.

The weight 10, therefore, requires no attachment/detachment member such as to be included in a conventional weight, in order to restrain the suspended-load rope 7 from removal. This eliminates the possibility of falling of the detachable member. In addition, the weight 10 requires no mechanism for preventing the attachment/detachment member from falling. This allows the weight 10 to be composed of a few number of components. The weight 10, thus, provides both the effect of preventing a trouble of falling of the attaching/detaching member and the effect of reducing a manufacturing cost due to the simple structure. Furthermore, the omission of the attachment/detachment work of the attachment/detachment member or the like allows the man-hours for the installation work of the suspended-load rope 7 to be reduced and allows the work time for installation of the suspended-load rope 7 to be shorten.

The shape of the rope insertion space, in particular, the shape of the slit part constituting the rope insertion space, can be appropriately modified. For example, as shown in FIGS. 11 to 18, the obliquity angle and the obliquity direction of the slit part to the center axis P is flexible.

Figure 11:
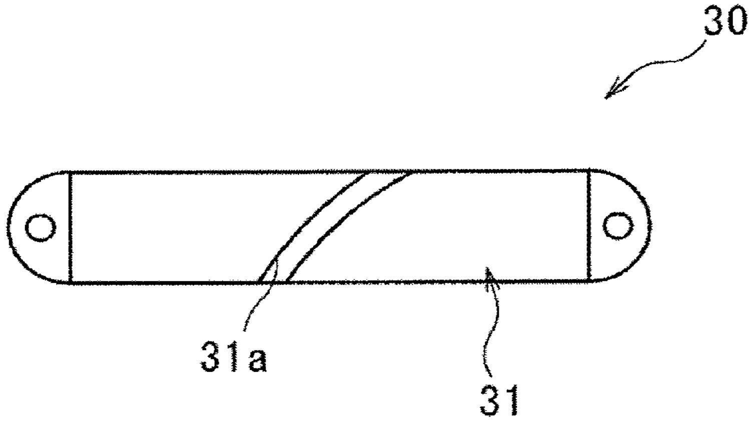
FIG. 11 is a front view of a weight according to a first modification with respect to a slit part constituting a rope insertion space of the weight.
Figure 12:
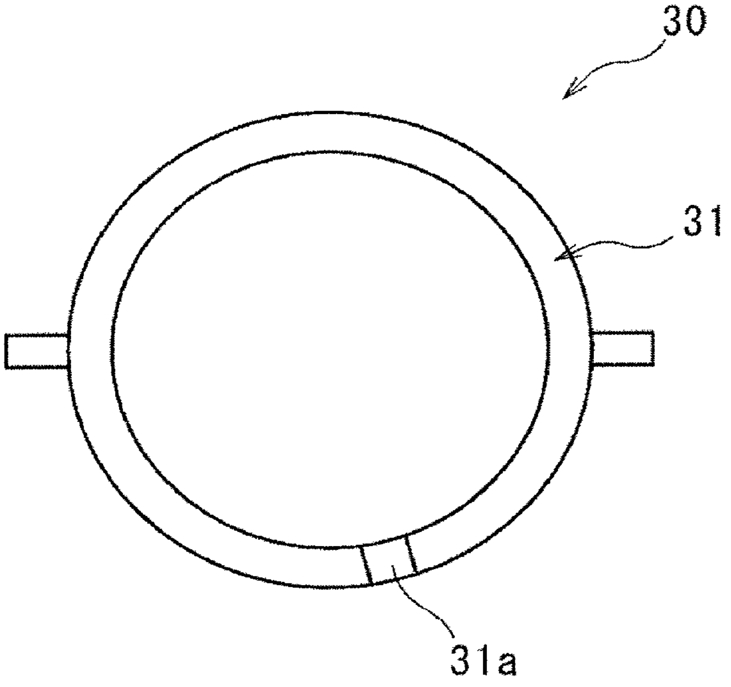
FIG. 12 is a plan view of the weight shown in FIG. 11.

FIG. 11 and FIG. 12 show a weight 30 according to the first modification with respect to the slit part. The weight 30 includes a weight body 31, in which a slit 31*a* is formed to constitute as a rope insertion space. The slit 31*a* extends from one end to the other end of the weight body 31 in an axis direction that is parallel to the center axis of the weight body 31, being oblique to the center axis over the entire region thereof. Thus, the slit 31*a* is an oblique slit part, and the rope insertion space is composed of only the oblique slit part. The slit 31*a* has a curved shape when viewed from the front of the weight body 31. The shape makes it possible to restrain the suspended-load rope from unintended removal from the weight body 31 to the outside in the radius direction through the slit 31*a*.

Figure 13:
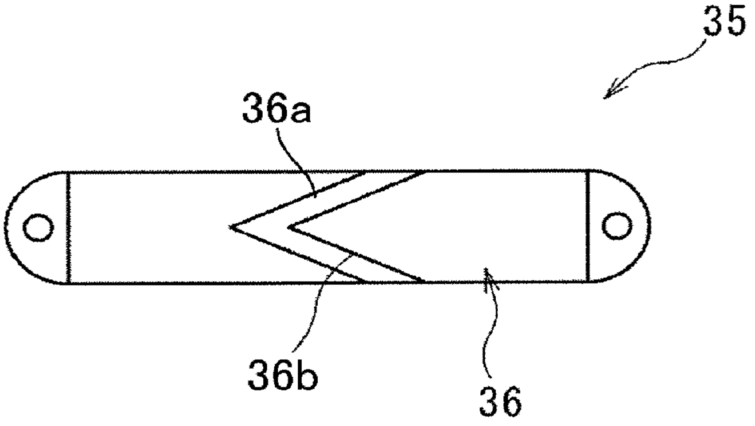
FIG. 13 is a front view of a weight according to a second modification with respect to a slit part.
Figure 14:
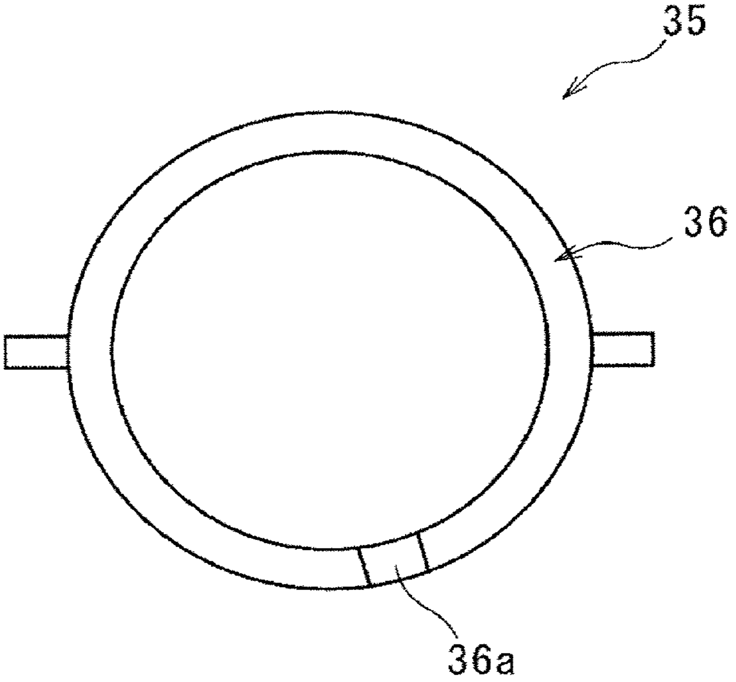
FIG. 14 is a plan view of the weight shown in FIG. 13.

FIG. 13 and FIG. 14 show a weight 35 according to the second modification. The weight 35 includes a weight body 36, in which a first slit 36*a* and a second slit 36*b* are formed to constitute a rope insertion space. The rope insertion space extends from one end to the other end of the weight body 36 in an axis direction that is parallel to the center axis of the weight body 36, being oblique to the center axis over the entire region thereof; however, the obliquity direction to the center axis is changed in the longitudinal middle. Specifically, the first slit 36*a* and the second slit 36*b* are continued with each other in the axis direction and are oblique to the center axis in reverse directions to each other. The first slit 36*a* forms a first oblique slit part oblique to one side in the circumference direction of the weight body 36. The second slit 36*b* forms a second oblique slit part that is formed so as to be continuous with the first slit 36*a* in the axis direction, being oblique in a direction reverse to that of the first slit 36*a*. Such change in the obliquity direction of the rope insertion space in the middle thereof enhances the effect of restraining the suspended-load rope from unintended removal from the weight body 36 through the rope insertion space, namely, the first and second slits 36*a* and 36*b* in the present embodiment.

Figure 15:
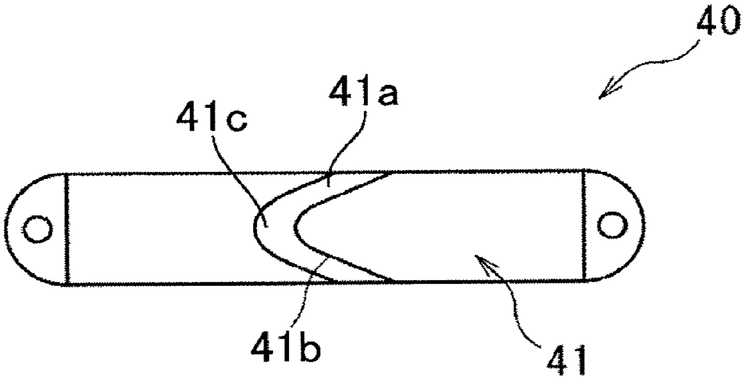
FIG. 15 is a front view of a weight according to a third modification with respect to a slit part.
Figure 16:
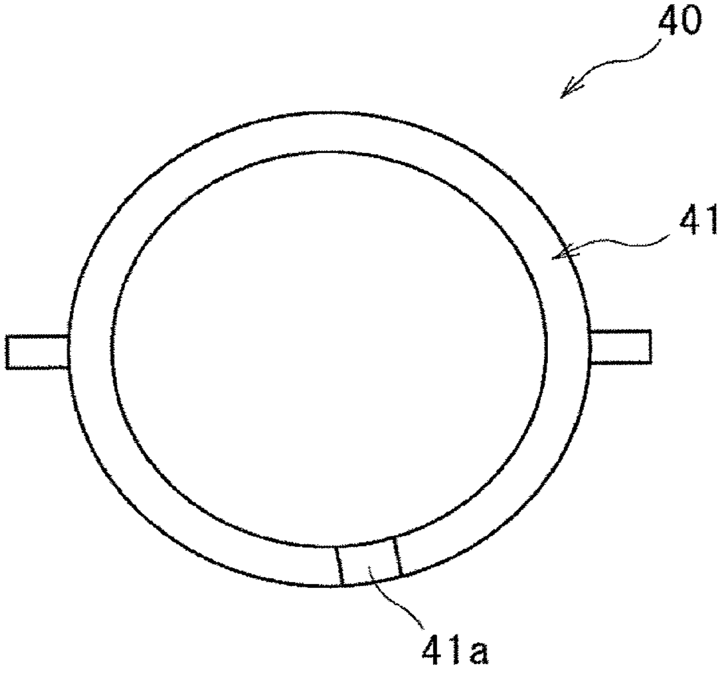
FIG. 16 is a plan view of the weight shown in FIG. 15.

FIG. 15 and FIG. 16 show a weight 40 according to the third modified example. The weight 40 includes a weight body 41, in which a first slit 41*a*, a second slit 41*b*, and an obliquity change part 41*c* are formed to constitute a rope insertion space. The rope insertion space extends from one end to the other end of the weight body 41 in an axis direction parallel to the center axis of the weight body 41, being oblique to the center axis over the substantially entire region thereof; however, the obliquity direction is reversed at the obliquity change part 41*c*. Specifically, the first and second slits 41*a* and 41*b* constitute first and second oblique slit parts that are oblique to the center axis in reverse directions to each other, respectively. The obliquity change part 41*c* interconnects the first slit 41*a* and the second slit 41*b* so as to make the obliquity direction of the rope insertion space change continuously from the obliquity direction of the first slit 41*a* to the obliquity direction of the second slit 41*b* opposite to the obliquity direction of the first slit 41*a*. The rope insertion space having such a shape also can effectively restrain the suspended-load rope from unintended removal from the weight body 41 through the rope insertion space.

Figure 17:
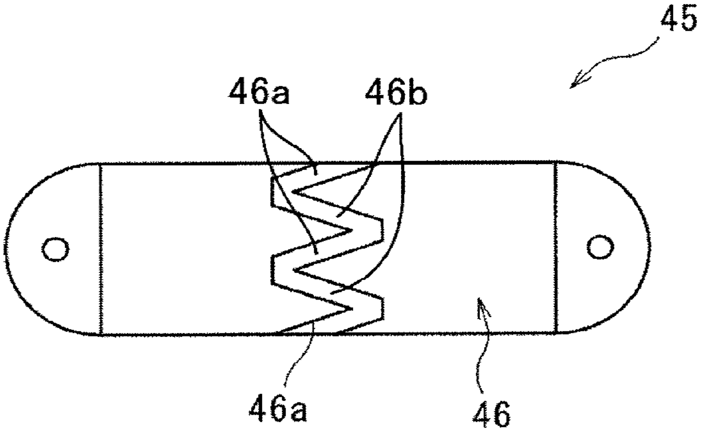
FIG. 17 is a front view of a weight according to a fourth modification with respect to a slit part.
Figure 18:
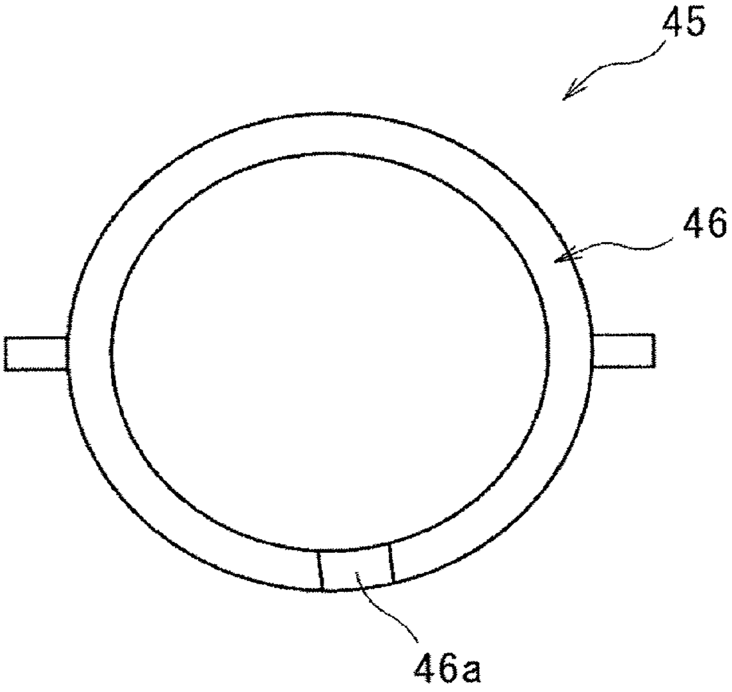
FIG. 18 is a plan view of the weight shown in FIG. 17.

FIG. 17 and FIG. 18 show a weight 45 according to the fourth modification. The weight 45 includes a weight body 46, in which a plurality of first slits 46*a* and a plurality of second slits 46*b* are formed in alternate arrangement in the axis direction to constitute a rope insertion space. Each of the first slits 46*a* constitutes a first oblique slit part oblique to the center axis of the weight body 46 in a first direction, while each of the second slits 46*b* constitutes a second oblique slit part oblique to the center axis in a second direction opposite to the first direction. In short, the rope insertion space forms a bellows shape (zigzag shape) in a front view of the weight body 46. The rope insertion space, in which the plurality of first oblique slit parts and the plurality of second oblique slit parts are thus alternately arranged so as to change the obliquity direction of the rope insertion space to the center axis in multiple stages, can restrain the suspended-load rope more effectively from unintended removal from the weight body 46 through the rope insertion space.

The rope insertion space is not limited to one constituted by only the oblique slit part. FIGS. 19 to 22 show examples of a rope insertion space including a slit part other than the oblique slit part.

Figure 19:
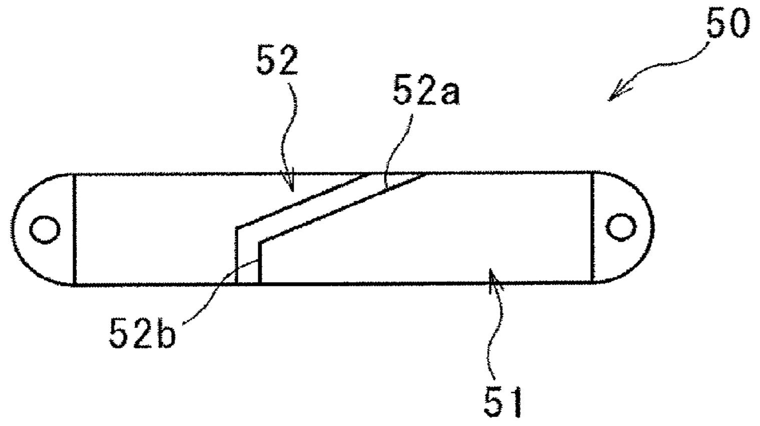
FIG. 19 is a front view of a weight according to a fifth modification with respect to a slit part.
Figure 20:
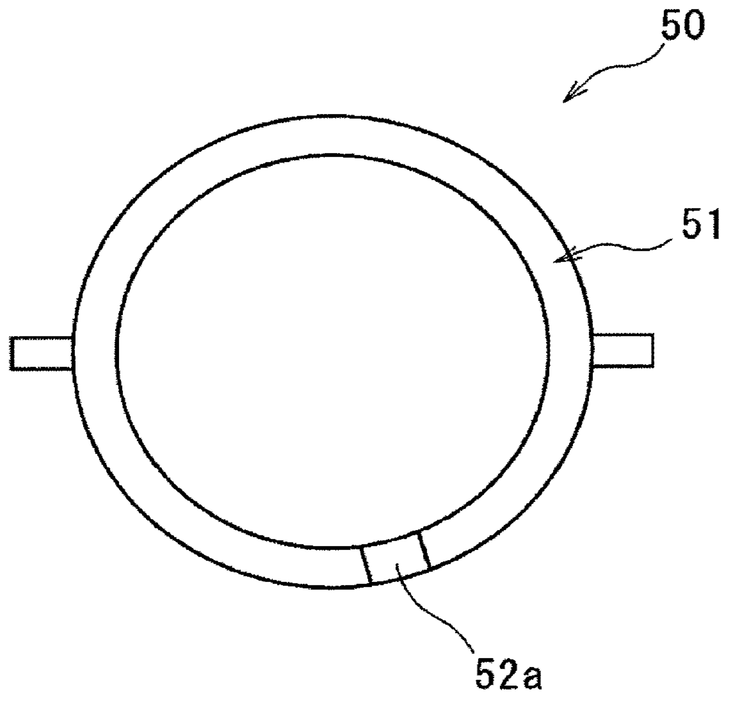
FIG. 20 is a plan view of the weight shown in FIG. 19.

FIG. 19 and FIG. 20 show a weight 50 according to the fifth modification. The weight 50 includes a weight body 51, in which an oblique slit 52*a* and an axial slit 52*b* are formed to constitute a rope insertion space 52. The oblique slit 52*a* forms an oblique slit part oblique to the center axis of the weight body 51, whereas the axial slit 52*b* forms a non-oblique slit part which extends in parallel with the center axis, that is, extends in the axis direction with no obliquity to the center axis. The rope insertion space 52, which has a shape bent in the longitudinal middle of the rope insertion space 52, also can effectively restrain the suspended-load rope from unintended removal from the weight body 51 through the rope insertion space.

Figure 21:
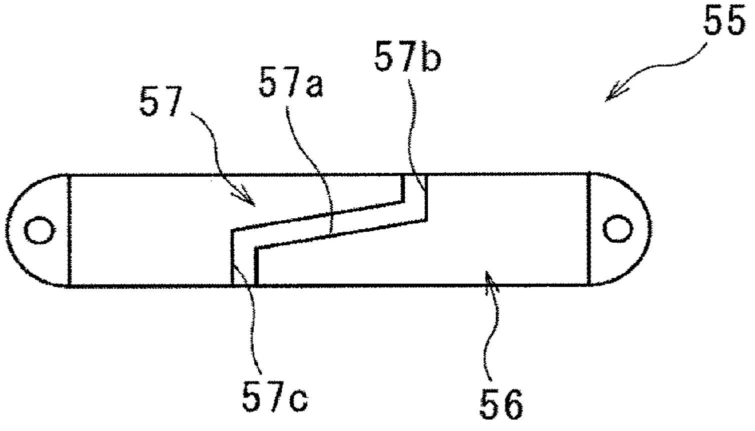
FIG. 21 is a front view of a weight according to a sixth modification with respect to a slit part.
Figure 22:
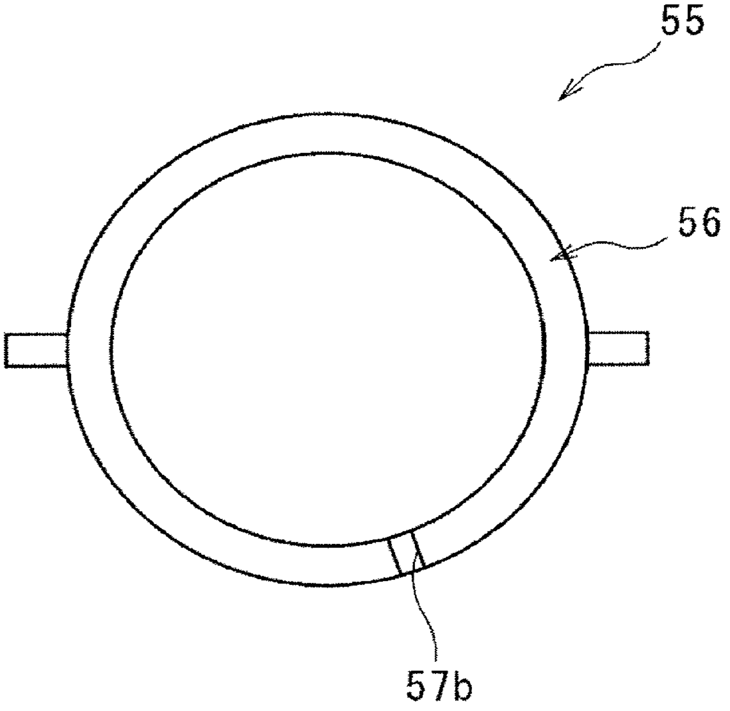
FIG. 22 is a plan view of the weight shown in FIG. 21.

FIG. 21 and FIG. 22 show a weight 55 according to the sixth modification. The weight 55 includes a weight body 56, in which an oblique slit 57*a*, a first axial slit 57*b* and a second axial slit 57*c* are formed to constitute a rope insertion space 57. The oblique slit 57*a* forms an oblique slit part oblique to the center axis of the weight body 56. The first axial slit 57*b* is a non-oblique slit part extending in the axis direction from one end (upper end in FIG. 21) out of opposite ends of the oblique slit 57*a* to one end (upper end in FIG. 21) of the weight body 56 in the axis direction, and the second axial slit 57*c* is a non-oblique slit part extending in the axis direction from the other end (lower end in FIG. 21) of the opposite ends of the oblique slit 57*a* to the other end (lower end in FIG. 21) of the weight body 56 in the axis direction. The rope insertion space 57, which thus includes the plurality of slits so as to be bent at a plurality of positions in the longitude direction, can effectively restrain the suspended-load rope from unintended removal from the weight body 56 through the rope insertion space 57.

The rope insertion space may be formed so as to straddle the weight body and the attachment part.

The specific shape of the attachment part also is not limited to the shape of the pair of attachment parts 22 according to the above embodiment. There will be described modifications with respect to the attachment part with reference to FIGS. 23 to 25.

Figure 23:
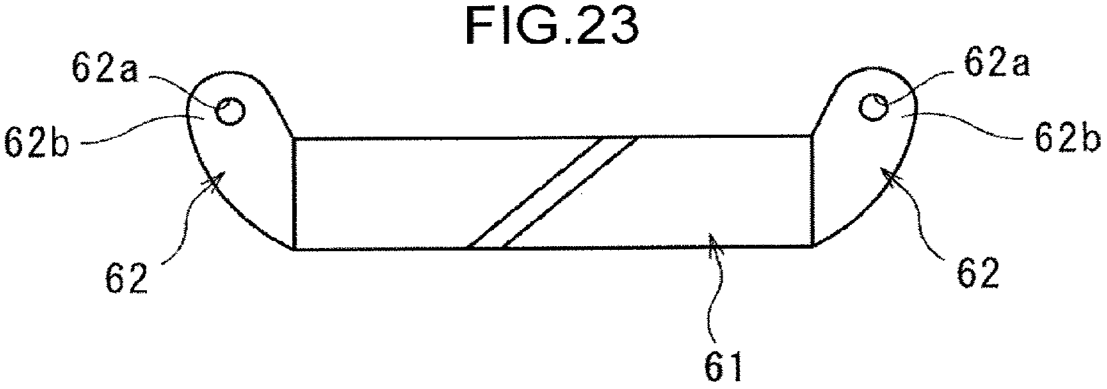
FIG. 23 is a front view of a weight according to a first modification with respect to an attachment part of the weight.

FIG. 23 shows a weight according to the first modification with respect to the attachment part. The weight includes a weight body 61 and a pair of attachment parts 62. The pair of attachment parts 62 protrude from the outer peripheral surface of the weight body 61 outward in the radius direction of the weight body 61. The pair of attachment parts 62 have respective connection holes 62*a* connectable to a not-graphically-shown pair of string-like parts, respectively. Each of the attachment parts 62 includes a protrusion 62*h* protruding upward beyond the weight body 61, and the connection hole 62*a* is provided so as to pass through the protrusion 62*b* horizontally.

Figure 24:
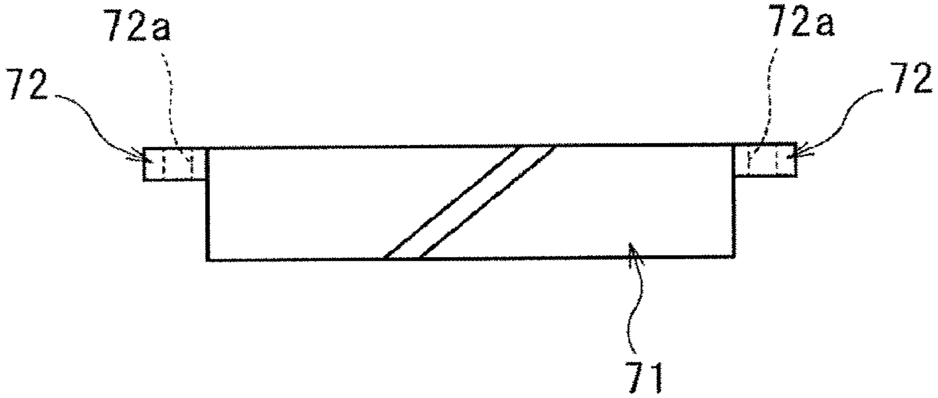
FIG. 24 is a front view of a weight according to a second modification h respect to an attachment part.

FIG. 24 shows a weight according to the second modification with respect to the attachment part. The weight includes a weight body 71 and a pair of attachment parts 72. The pair of attachment parts 72 protrude from the outer peripheral surface of the weight body 71 outward in the radius direction of the weight body 71. Each of the attachment parts 72 has a plate shape with a thickness direction parallel to the center axis of the weight body 71. The pair of attachment parts 72 have respective connection holes 72*a* connectable to a not-graphically-shown pair of string-like parts, respectively. The connection hole 72*a* passes through the attachment part 72 in the thickness direction of the attachment part 72.

Figure 25:
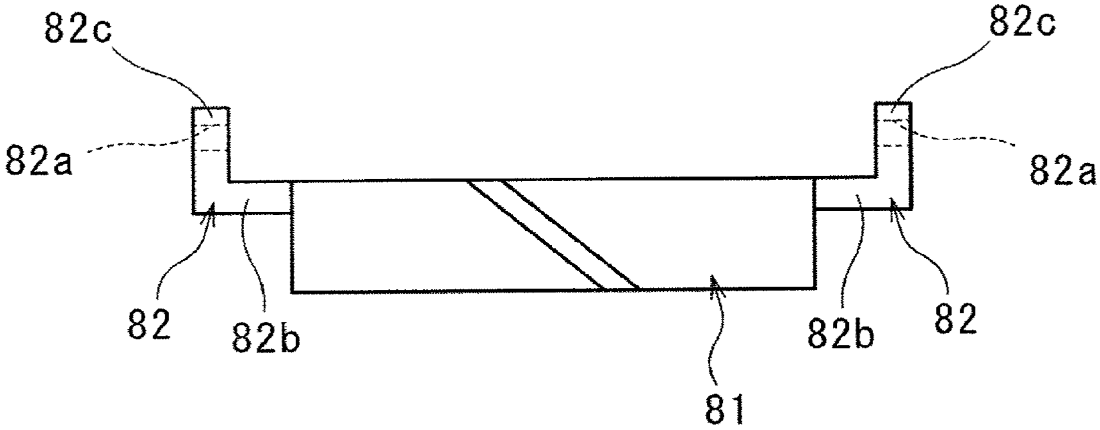
FIG. 25 is a front view of a weight according to a third modification with respect to an attachment part.

FIG. 25 shows a weight according to the third modification with respect to the attachment part. The weight includes a weight body 81 and a pair of attachment parts 82. The pair of attachment parts 82 includes a base part 82*b* and a connection part 82*c*. The base part 82*b* is connected to the outer peripheral surface of the weight body 81 and protrudes from the outer peripheral surface outward in the radius direction of the weight body 81. The connection part 82*c* protrudes upward from an outer end of the base part 82*b*. The connection part 82*c* is formed with a connection hole 82*a* passing through the connection part 82*c* in the radius direction of the weight body 81, and respective connection holes 82*a* are connectable to a not-graphically-shown pair of string-like parts, respectively.

The rope insertion space according to the present invention may include a space other than the slit, for example, an opening with a large width. As an example thereof will be described a second embodiment of the present invention with reference to FIGS. 26 to 28.

Figure 26:
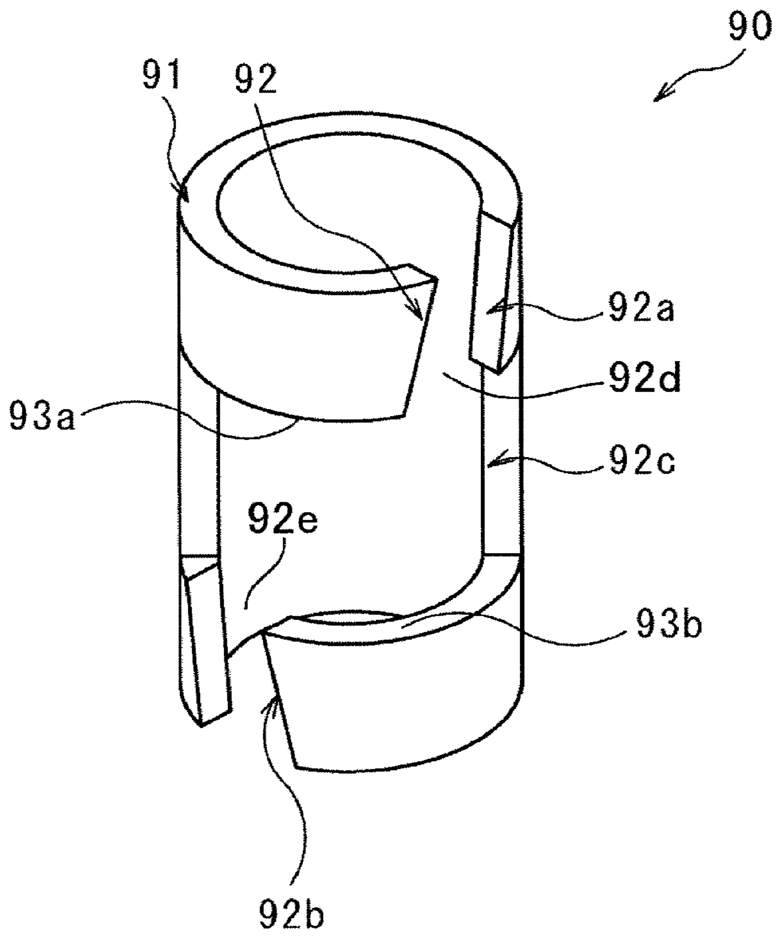
FIG. 26 is a perspective view of a weight according to a second embodiment of the present invention.
Figure 27:
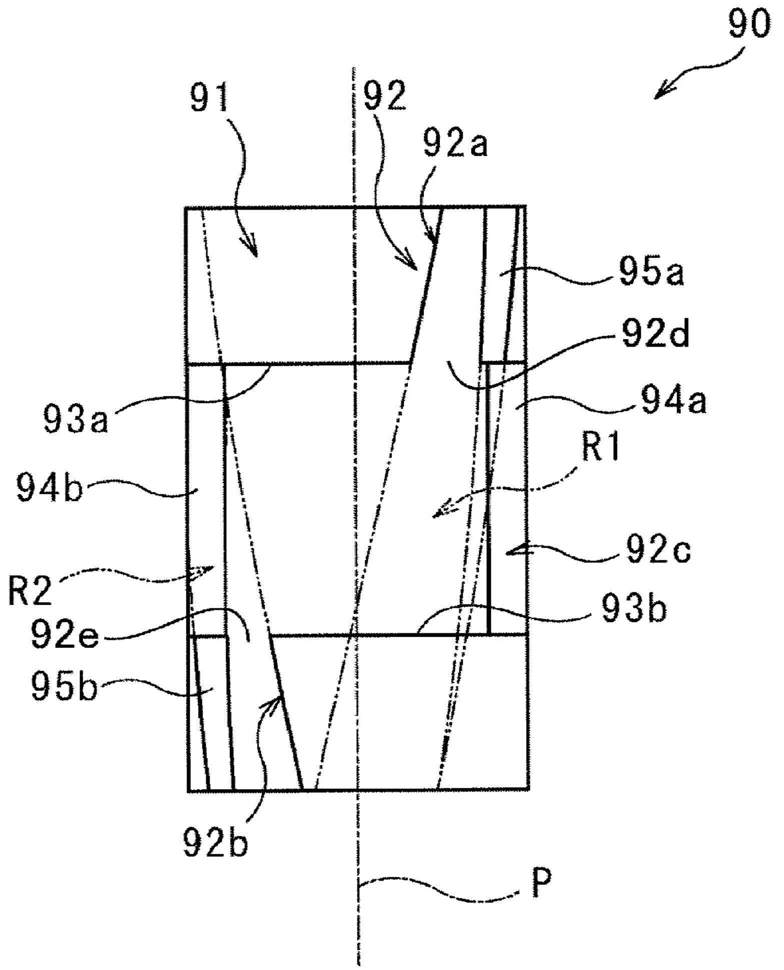
FIG. 27 is a front view of the weight shown in FIG. 26.
Figure 28:
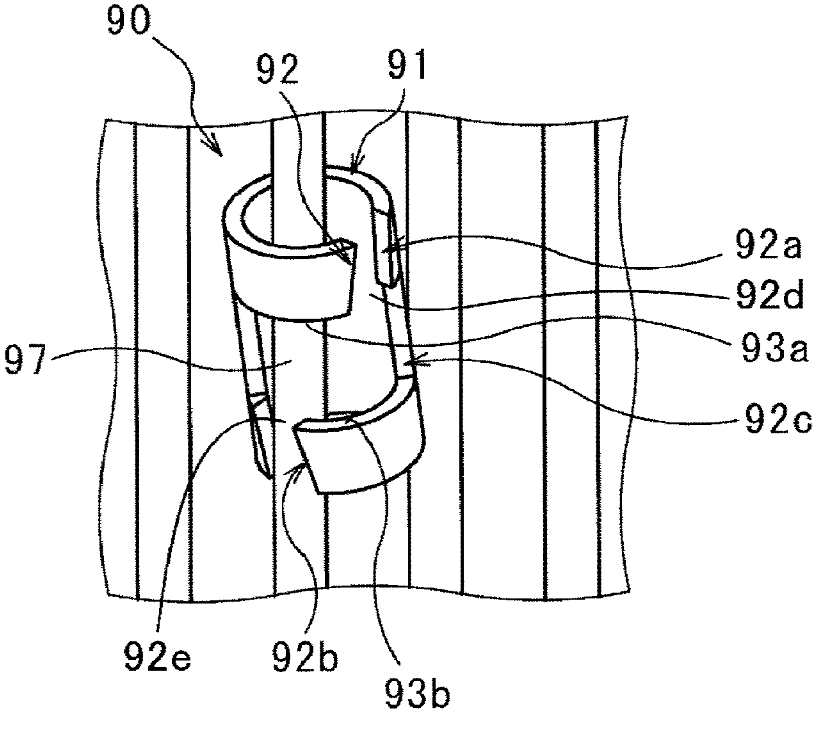
FIG. 28 is a perspective view showing a state where the suspended-load rope is inserted into the weight shown in FIG. 26.

FIG. 26 and FIG. 27 show a weight 90 according to the second embodiment. Similarly to the weight 10 shown in FIGS. 4 to 10, the weight 90 is disposed around the suspended-load rope so as to detect over-winding of the suspended-load rope suspended from a derricking member of a construction machine, for example, the jib 5 shown in FIG. 1 and FIG. 2. In short, the weight 90 can be used in place of the weight 10. The weight 90 includes a weight body 91, which has a cylindrical shape enclosing the suspended-load rope while being suspended through at least one string-like part suspended from the derricking member.

A rope insertion space 92 is formed in a part of the weight body 91 with respect to the circumference direction. The rope insertion space 92 passes through the weight body 91 in the radius direction to allow the suspended-load rope to be inserted therethrough in the radius direction. The rope insertion space 92 has a shape that cuts through the weight body from one end to the other end of the weight body 91 with respect to the axis direction parallel to the center axis P of the weight body 91.

The rope insertion space 92 is constituted by a first oblique slit part 92*a*, a second oblique slit part 92*b* and an intermediate opening part 92*c*. The first and second oblique slit parts 92*a* and 92*b* are separated from each other in the axis direction, and each of the first and second oblique slit parts 92*a* and 92*h* is oblique to the center axis of the weight body 91. The intermediate opening part 92*c* is interposed between the first oblique slit part 92*a* and the second oblique slit part 92*b*. The intermediate opening part 92*c* has a width, which is the dimension in the circumference direction of the weight body 91, larger than the width of each of the first oblique slit part 92*a* and the second oblique slit part 92*b*. Although not graphically shown, the weight 90 may include a pair of attachment parts to be connected to a pair of string-like parts included in the at least one string-like part, respectively, at a position deviated from the rope insertion space 92 on the outer peripheral surface of the weight body 91. Preferably, the pair of attachment parts are disposed at a pair of attachment positions opposed to each other in the radius direction across the center axis P of the weight body 91, respectively.

The weight body 91 is preferably cylindrical. Specifically, it is preferable that each of the inner diameter and the outer diameter of the weight body 91 is uniform with respect to the axis direction. The weight body 91 may be a long cylindrical shape having a larger length in the axis direction than the outer diameter of the weight body 91. The weight body 91 having such a long cylindrical shape, when disposed around a specific suspended-load rope out of a plurality of suspended-load ropes being suspended, can restrain the specific suspended-load rope from interfering with the suspended-load rope which is adjacent to the specific suspended-load rope.

According to the weight 90, which has both the first and second oblique slit parts 92*a* and 92*b* and the intermediate opening part 92*c* having the width larger than the width of each of the first and second oblique slit parts 92*a* and 92*b*, the intermediate opening part 92*c* allows the suspended-load rope to be easily inserted into the inside of the weight body 91 even when, for example, the weight body 91 has a long cylindrical shape, while the first and second oblique slit parts 92*a* and 92*b* restrain the suspended-load rope from unintended removal from the weight body 91. Besides, giving the weight 90 a great axial length allows the weight 90 to have a large weight.

Although the extension of a first center line that is the center line of the first oblique slit part 92*a* and a second center line that is the center line of the second oblique slit part 92*b* may coincide with each other, it is more preferable that the second center line is deviated from the extension of the first center line. This makes it possible to restrain the suspended-load rope more reliably from unintended removal from the weight body 91. Moreover, for more reliable restraint of the removal, it is preferable that a first virtual region R1 shown in FIG. 27 is deviated from a second opening-side end 92*c* in the circumference direction and a second virtual region R2 is deviated from a first opening-side end 92*d* in the circumference direction. The first virtual region R1 is a region extended from the first oblique slit part 92*a* toward the opening part 92*c* along the shape thereof, and the second opening-side end 92*e* is an end continued to the intermediate opening part 92*c* out of the opposite ends of the second oblique slit part 92*b*. The second virtual region R2 is a region extended from the second oblique slit part 92*b* toward the intermediate opening part 92*c* along the shape thereof, and the first opening-side end 92*d* is an end continued to the intermediate opening part 92*c* out of the opposite ends of the first oblique slit part 92*a*.

Respective obliquity directions of the first and second oblique slit parts 92*a* and 92*b* to the center axis P may be either the same or opposite to each other. The latter makes it possible to restrain the suspended-load rope more reliably from unintended removal from the weight body 91. Besides, the intermediate opening part 92*c* interposed between the first oblique slit part 92*a* and the second oblique slit part 92*b* enables insertion work of the suspended-load rope 97 shown in FIG. 28 to be easily performed. The insertion work includes: for example, passing the suspended-load rope 97 through the first oblique slit part 92*a*; thereafter tilting the weight body 91 or curving the suspended-load rope 97 so as to make the center axis of the second oblique slit part 92*b* and the center axis of the suspended-load rope 97 close to parallel to each other; and passing the suspended-load rope 97 through the second oblique slit part 92*b* in a state where both the center axes are thus made close to parallel to each other. Thus, in spite that the obliquity direction of the first oblique slit part 92*a* and the oblique direction of the second oblique slit part 92*b* are reverse to each other, the intermediate opening part 92*c* having a large width and interposed between the first and second oblique slit parts 92*a* and 92*b* allows the suspended-load rope 97 to be passed easily through the first and second oblique slit parts 92*a* and 92*b*.

With respect to the circumference direction of the weight body 91, the position of the first opening-side end 92*d* of the first oblique slit part 92*a* and the position of the second opening-side end 92*e* of the second oblique slit part 92*b* may be either coincident with each other or deviated from each other. The latter makes it possible to restrain the suspended-load rope 97 more reliably from unintended removal from the weight body 91. Besides, the first and second opening-side ends 92*d*, 92*e* preferably include respective parts that do not overlap each other when viewed in the axis direction parallel to the center axis P, and, more preferably, do not overlap at any point.

The width, the obliquity angle, the number of turns of each of the first oblique slit part 92*a* and the second oblique slit part 92*b* and the like can be set, for example, in the same manner as the slit 21*a* shown in FIGS. 4 to 10. Besides, the first oblique slit part 92*a* and the second oblique slit part 92*b* may have the same length.

The intermediate opening part 92*c* has a first end edge 93*a* and a second end edge 93*b* that are opposed to each other in the axis direction, and each of the first and second end edges 93*a* and 93*b* extends in the circumference direction of the weight body 91. The first opening-side end 92*d* of the first oblique slit part 92*a* is continued to one half of the first end edge 93*a* with respect to the circumference direction of the weight body 91, namely, the right half in FIG. 26 to FIG. 28, while the second opening-side end 92*e* of the second oblique slit part 92*b* is continued to the other half part of the second end edge 93*b* with respect to the circumference direction, namely, the left half part in FIG. 26 to FIG. 28. This makes it possible to restrain the suspended-load rope 97 more reliably from unintended removal from the weight body 91. Moreover, as shown in FIG. 27, the intermediate opening part 92*c* has opposite side edges in the circumference direction, namely, a first side edge 94*a* close to the first oblique slit part 92*a* (right side edge in FIG. 27) and a second side edge 94*b* close to the second oblique slit part 92*b* (left side edge in FIG. 27), wherein the second virtual region R2 extends toward the second side edge 94*b*. This enables the suspended-load rope 97 to be more reliably restrained from unintended removal from the weight body 91.

As shown in FIG. 27, it is preferable that the outer edge 95*a* of the first oblique slit part 92*a* and the first side edge 94*a* of the intermediate opening part 92*c* are deviated from each other in the circumference direction, and the outer edge 95*b* of the second oblique slit part 92*b* and the second side edge 94*b* of the intermediate opening part 92*c* are deviated from each other in the circumference direction. The outer edge 95*a* of the first oblique slit part 92*a* is the edge on the side closer to the first side edge 94*a* of the opposite side edges of the first oblique slit part 92*a* in the circumference direction, and the outer edge 95*b* of the second oblique slit part 92*b* is the edge closer to the second side edge 94*b* of the opposite side edges of the second oblique slit part 92*b* in the circumference direction. Specifically, the first opening-side end 92*d* of the first oblique slit part 92*a* is continued to a part of the first end edge 93*a* on the inner side (left side in FIG. 27) of the first side edge 94*a* with respect to the circumference direction, and the second opening-side end 92*e* of the second oblique slit part 92*b* is continued to a part of the second end edge 93*b* on the inner side (right side in FIG. 27) of the second side edge 94*b*. These make it possible to restrain the suspended-load rope 97 more reliably from unintended removal from the weight body 91.

The shape of the intermediate opening part 92*c* viewed in the radius direction of the weight body 91, although not limited, is preferably a rectangle having an upper side and a lower side that are formed by the first and second end edges 93*a* and 93*b*, respectively. This shape enables the first and second opening-side ends 92*d* and 92*e* to be largely apart from each other in the circumference direction of the weight body 91, thereby making it possible to restrain the suspended-load rope 97 more reliably from unintended removal from the weight body 91.

As described above, the weight 90 according to the second embodiment can restrain the suspended-load rope 97 from unintended removal from the weight body 91, while being easily attachable to and detachable from the suspended-load rope 97.

The above-described embodiment is not intended to limit the configuration of the present invention. The above-described embodiments, hence, may be omitted, substituted or added to the components of the above-described embodiments based on the description and technical knowledge of the present specification, which should be construed as belonging to the scope of the present invention.

The specific configuration of a construction machine in which the weight according to the present invention is to be used is not limited. For example, while the weight in the above-described embodiment is suspended through the pair of string-like parts at a position on the rear side of the position where the suspended-load rope is suspended, the weight may be suspended through the pair of string-like parts at a position on the front side of the position where the suspended-load rope is suspended. The weight may be suspended through at least one string-like part suspended from the same position as the suspended-load rope in the front-rear direction.

The string-like part and the suspended-load rope can be suspended from an arbitrary position of the derricking member. For example, the string-like part and the suspended-load rope may be suspended from the boom 4 shown in FIG. 1. The at least one string-like part and the suspended-load rope may be suspended from, for example, another derricking member connected to the distal end side of the jib 5. Although the suspended-load rope according to the above-described embodiment is a main winding rope, the suspended-load rope according to the present invention may be, for example, an auxiliary winding rope suspended from an auxiliary sheave.

As described above, the weight disclosed in the present application can restrain the suspended-load rope from removal from the weight body with no need for an attachment/detachment member; however, the invention encompasses an embodiment including an attachment/detachment member.

Specific configurations of the weight body and the pair of attachment parts disclosed in the present application are not limited to the configurations described in the above-described embodiments. For example, the weight body may have a guide roller for guiding the suspended-load rope.

The specific shape of the oblique slit part included in the rope insertion space disclosed in the present application is not limited to the configuration described in the above embodiment. For example, the obliquity direction and the obliquity angle of the oblique slit part to the center axis of the weight body are not limited.

In the above embodiment has been described a case where the construction machine is a crane. The weight, however, can be used for various devices which requires the detection of the over-winding of the suspended-load rope.

The invention claimed is:

1. A weight disposed around a suspended-load rope suspended from a derricking member of a construction machine to detect over-winding of the suspended-load rope, the weight comprising a weight body to be suspended from the derricking member through at least one string-like part, the weight body having a cylindrical shape capable of enclosing the suspended-load rope, wherein:

the weight body is formed with a rope insertion space partially with respect to a circumference direction, the rope insertion space passing through the weight body in a radius direction of the weight body to allow the suspended-load rope to be inserted through the rope insertion space in the radius direction;

the rope insertion space has a shape cutting through the weight body from one end of the weight body to the other end on an opposite side to the one end in an axis direction that is parallel to a center axis of the weight body;

the rope insertion space includes at least one oblique slit part oblique to the center axis so as to prevent the suspended-load rope from passing through the oblique slit part in a state where the center axis and the suspended-load rope are parallel to each other; and the at least one oblique slit part includes an oblique slit part having a width decreasing inward from an outside in the radius direction of the weight body.

2. The weight according to claim 1, wherein the at least one oblique slit part includes an oblique slit part having a constant obliquity angle to the center axis.

3. The weight according to claim 1, wherein the at least one oblique slit part includes a spiral slit part extending along a spiral around the center axis as a center, and the spiral has a number of turns that is smaller than 1.

4. The weight according to claim 1, wherein the at least one oblique slit part includes a first oblique slit part and a second oblique slit part that are located at respective positions different from each other in the axis direction.

5. The weight according to claim 4, wherein the first oblique slit part and the second oblique slit part have respective obliquity angles to the center axis, the obliquity angles being different from each other.

6. The weight according to claim 5, wherein the first oblique slit part and the second oblique slit part are oblique to the center axis in reverse directions to each other.

7. A weight disposed around a suspended-load rope suspended from a derricking member of a construction machine to detect over-winding of the suspended-load rope, the weight comprising:

a weight body to be suspended from the derricking member through at least one string-like part, the weight body having a cylindrical shape capable of enclosing the suspended-load rope, wherein:

the weight body is formed with a rope insertion space partially with respect to a circumference direction, the rope insertion space passing through the weight body in a radius direction of the weight body to allow the suspended-load rope to be inserted through the rope insertion space in the radius direction;

the rope insertion space has a shape cutting through the weight body from one end of the weight body to the other end on an opposite side to the one end in an axis direction that is parallel to a center axis of the weight body;

the rope insertion space includes at least one oblique slit part oblique to the center axis so as to prevent the suspended-load rope from passing through the oblique slit part in a state where the center axis and the suspended-load rope are parallel to each other; and the rope insertion space is composed of only the at least one oblique slit part.

8. The weight according to claim 7, wherein the at least one oblique slit part includes an oblique slit part having a constant obliquity angle to the center axis.

9. The weight according to claim 7, wherein the at least one oblique slit part includes a spiral slit part extending along a spiral around the center axis as a center, and the spiral has a number of turns that is smaller than 1.

10. A weight disposed around a suspended-load rope suspended from a derricking member of a construction machine to detect over-winding of the suspended-load rope, the weight comprising a weight body to be suspended from the derricking member through at least one string-like part, the weight body having a cylindrical shape capable of enclosing the suspended-load rope, wherein:

the weight body is formed with a rope insertion space partially with respect to a circumference direction, the rope insertion space passing through the weight body in a radius direction of the weight body to allow the suspended-load rope to be inserted through the rope insertion space in the radius direction;

the rope insertion space has a shape cutting through the weight body from one end of the weight body to the other end on an opposite side to the one end in an axis direction that is parallel to a center axis of the weight body;

the rope insertion space includes at least one oblique slit part oblique to the center axis so as to prevent the suspended-load rope from passing through the oblique slit part in a state where the center axis and the suspended-load rope are parallel to each other;

the at least one oblique slit part includes a first oblique slit part and a second oblique slit part that are apart from each other in the axis direction; and the rope insertion space further includes an intermediate opening part interposed between the first oblique slit part and the second oblique slit part, the intermediate opening part having a width larger than a width of the first oblique slit part and larger than a width of the second oblique slit part.

11. The weight according to claim 10, wherein the center line of the second oblique slit part is deviated from an extension of the center line of the first oblique slit part.

12. The weight according to claim 11, wherein the first oblique slit part and the second oblique slit part are oblique to the center axis in reverse directions to each other.

13. The weight according to claim 10, wherein the first oblique slit part has a first opening-side end which is an end continued to the intermediate opening part, and the second oblique slit part has a second opening-side end which is an end continued to the intermediate opening part, the second opening-side end being located at a position deviated from a position of the first opening-side end in the circumference direction of the weight body.

14. The weight according to claim 13, wherein:

the intermediate opening has a first edge and a second edge that are opposed to each other in the axis direction, each of the first edge and the second edge extending in the circumference direction of the weight body;

the first opening-side end is continued to one half of the first end edge with respect to the circumference direction; and the second opening-side end is continued to the other half of the second end edge in the circumference direction.

15. The weight of claim 14, wherein the intermediate opening has a shape of rectangle when viewed of the weight body in the radius direction, the rectangle having upper side and lower side that are formed by the first end edge and the second end edge, respectively.

16. The weight according to claim 10, wherein the at least one oblique slit part includes an oblique slit part having a constant obliquity angle to the center axis.

17. The weight according to claim 10, wherein the at least one oblique slit part includes a spiral slit part extending along a spiral around the center axis as a center, and the spiral has a number of turns that is smaller than 1.

18. The weight according to claim 10, wherein the at least one oblique slit part includes a first oblique slit part and a second oblique slit part that are located at respective positions different from each other in the axis direction.

19. The weight according to claim 18, wherein the first oblique slit part and the second oblique slit part have respective obliquity angles to the center axis, the obliquity angles being different from each other.

* * * * *